United States Patent [19]

Lewis et al.

[11] Patent Number: 5,520,949
[45] Date of Patent: May 28, 1996

[54] GRAIN PRODUCT

[75] Inventors: Victor M. Lewis; David A. Lewis, both of Rushcutters Bay, Australia

[73] Assignee: Byron Agricultural Company Pty. Ltd., New South Wales, Australia

[21] Appl. No.: 401,364

[22] Filed: Mar. 9, 1995

[30]     Foreign Application Priority Data

Mar. 15, 1994 [AU] Australia .................. PM4474

[51] Int. Cl.$^6$ ................................. A23L 1/182
[52] U.S. Cl. ........................... 426/618; 426/443
[58] Field of Search ................... 426/618, 640, 426/463, 464, 466, 467, 461, 462, 443

[56]           References Cited

U.S. PATENT DOCUMENTS

| | | |
|---|---|---|
| 2,638,838 | 5/1953 | Talmey et al. . |
| 2,884,327 | 4/1959 | Robbins . |
| 2,930,697 | 3/1960 | Miller . |
| 2,975,058 | 3/1961 | Colarusso ................. 426/462 |
| 3,132,948 | 5/1964 | Smith et al. . |
| 3,162,535 | 12/1964 | Ferrel . |
| 3,190,754 | 6/1965 | Mathews . |
| 3,228,771 | 1/1966 | Copley et al. . |
| 3,264,113 | 8/1966 | Barta et al. . |
| 3,342,607 | 9/1967 | Hickey ..................... 426/464 |
| 3,457,084 | 7/1969 | Weiss . |
| 3,526,511 | 9/1970 | Rockland . |
| 3,778,521 | 12/1973 | Fisher et al. . |
| 4,133,898 | 1/1979 | Carlson et al. ............ 426/467 |
| 4,233,327 | 11/1980 | Ando et al. ............... 426/462 |
| 4,699,797 | 10/1987 | Fast ......................... 426/508 |
| 5,002,787 | 3/1991 | Fraile et al. ............... 426/467 |
| 5,183,682 | 2/1993 | Lai ........................... 426/466 |

FOREIGN PATENT DOCUMENTS

| | | |
|---|---|---|
| 0120063 | 7/1984 | Japan . |
| 0227292 | 12/1984 | Japan . |
| 814756 | 6/1959 | United Kingdom . |

*Primary Examiner*—Donald E. Czaja
*Assistant Examiner*—Linda H. Tonucci
*Attorney, Agent, or Firm*—Scully, Scott, Murphy & Presser

[57]              ABSTRACT

The present invention relates to a whole grain preferably wheat product and a process of preparing same, said product being prepared by the steps of increasing the moisture content of the grain to about 20–45%; heating the hydrated grain at temperatures ranging between 100°–130° C. for 7–50 minutes; dehydrating the grain to a moisture content of about 18–30%; compressing the grains following a short tempering period; and rapidly drying the grains following compression.

18 Claims, No Drawings

GRAIN PRODUCT

BACKGROUND OF THE INVENTION

The major source of starchy carbohydrate foods on a global basis is derived from grains (Gramineae). While there are other important starchy carbohydrate sources, such as potatoes, cassava, sweet potatoes etc., grains are pre-eminent in providing starchy carbohydrate energy for the world's population. One reason for this is that grains are harvested in a naturally dry state and hence are relatively non-perishable. By contrast potatoes, cassava and sweet potatoes, for example, are harvested at an elevated moisture content and because of this they have a shorter storage life in their harvested state.

Of the major food grains, wheat is produced in the largest tonnage. Rice and corn are produced in very large quantities, with barley, rye, sorghum, oats, millets etc being produced in substantial but lesser amounts. Of those grains which are used directly for food for human consumption (as distinct from grains which are used for animal feeds) rice is the only major grain which is cooked (mostly as white rice and to some extent as brown rice) by the ultimate consumer predominantly in a whole-grain form. No doubt the reason for this is that rice may be cooked, for example, by boiling in water in a period of time which is conveniently short, for example 15–20 minutes. Other major grains such as wheat, corn, rye, sorghum, barley, are very slow (and hence inconvenient) to cook. As a consequence the major usage of these grains as food is in the form of flours, flakes or meals which are more conveniently consumed in various forms such as bakery products, porridge, pastas, etc.

There exists however, especially in the Middle East, a traditional food based on whole-grain wheat whereby the grain is consumed as a whole or cracked grain in the form of Bulgur (or Burghul). Bulgur is really a parboiled wheat product (analogous to parboiled rice). However, since whole-grain bulgur is fairly slow cooking, (45–60 minutes of cooking) the individual grains are usually cracked into small pieces so that the consumer can cook the bulgur in a more conveniently shorter time. Even so cracked bulgur requires cooking for 10–15 minutes then gently steaming for a similar period.

PRIOR RESEARCH

The technical and patent literature describes a number of methods for producing bulgur, by both traditional and by more modern industrial methods.

U.S. Pat. Nos. 2,884,327 and 3,778,521 (Fisher et al) describe a process for the continuous production of bulgur.

U.S. Pat. No. 3,526,511 (Rockland et al) describes a quick-cooking whole-grain wheat food produced by impregnating the grains with a solution of salt, alkaline salts and a chelating salt, the grains then being dried.

U.S. Pat. No. 2,930,697 (Miller) produces a quick cooking wheat grain product by soaking the grains to soften them, partially flattening the grain, further hydrating and cooking the grain to cause substantial swelling and to achieve substantial and uniform gelatinisation then drying the swollen grain in rapidly moving air so that the grain sets and dries in its enlarged condition.

U.S. Pat. No. 3,457,084 (Weiss) produces a water-saturated wheat grain which is gelatinised by radio frequency energy.

U.S. Pat. No. 3,190,754 (Matthews) steeps the wheat in caustic soda and an ammonium salt, then elutes the alkaline materials, neutralises it and dries it.

U.S. Pat. No. 3,264,113 (Barta et al) uses hot alkali to strip the bran layer from whole grains of wheat, typically preheated by steam or water, followed by vigorous agitation in cold water to remove the alkalinised bran layer, neutralisation and drying. The final product is light coloured and cooks in 15 to 30 minutes.

U.S. Pat. No. 3,162,535 (Ferrel) uses previously fully parboiled and debranned wheat which is then heated in rapidly moving air preferably at 260°–316° C. to achieve a puffing effect. The puffed wheat product is prepared for eating by adding boiling water and allowing the food to stand for about 5 minutes.

U.S. Pat. No. 3,228,771 (Copley et al) describes a more elaborate method of bran removal from raw wheat grain (i.e., not parboiled) with an associated bleaching step, followed by hot air puffing. The puffed products cooked in 10–20 minutes as compared to the 45–60 minutes required to cook wheat which has not been puffed.

OBJECTS OF THE INVENTION

The present invention has as its primary object the production of whole-grain (preferably wheat) quick-cooking grain which may be cooked in a few minutes, providing thereby a convenient carbohydrate food which may be used as an alternative to potatoes, pasta, rice or other forms of cooked carbohydrate as well as in other ways.

A further object is the production of a grain product in which all the bran germ and other components having high nutritional value may be left substantially present in the final product.

A yet further object is to produce a grain product which does not have a strong parboiled or toasted flavour when finally cooked for eating.

A further object is to produce a grain product which does not necessarily require cooking and may be consumed after brief soaking in water or even in its dry form as a crunchy cereal-type food.

It is also an object of the invention that there should be minimum or no use of chemical additives such as alkalis, salts, chelating agents and the like in processing the grains, since there is a negative reaction by many consumers towards the use of chemicals in the processing of basic foods.

A still further object is to produce a whole-grain quick-cooking product by a process during which the amount of absorption of moisture by the grain is minimised thereby achieving maximum economy. Other objects and advantages will be apparent from the ensuing detailed description of a grain product (preferably wheat) and its preparation.

SUMMARY OF THE INVENTION

The invention discloses a process for preparing an edible food product from wheat and other whole grains wherein the processed product is recognisable as in natural grain, except where the grain has been subdivided after completion of the process, said whole grain product being quick-cooking, or quickly rehydratable and then suitable for consumption either before or after cooking and rehydration, the process comprising the steps of:

(a) increasing the water content of the grain to a predetermined level, preferably by soaking in water until the moisture content is about 20%–45%

(b) heating the hydrated grain at temperatures ranging between 100°–130° C. for 7–50 minutes, preferably by heating in live steam (c) subjecting the heated grains to partial dehydration to decrease the moisture content to about 18 to 30%

(d) optionally removing a proportion of the outer bran layer (e) subjecting the processed grain to compression preferably by passing the grains after brief tempering between rollers (f) rapidly drying the grains either immediately after compression or after the compressed grains have been further dried to a moisture content of about 12%. The invention also relates to a grain product produced by this process. In accordance with this process a quick-cooking or ready to eat grain product is produced which may be cooked by total absorption of the cooking fluid in about 2 to about 7 minutes depending on the chosen processing details, the grains of the cooked food product being separate, non-cohesive, tender, of attractive colour and flavour and having a very desirable nutritional profile and an appearance resembling a natural integral whole grain in cooked form.

It is also within the scope of this process for the final whole grain product to be reduced in size :for example by crushing to produce a whole-grain cous-cous like product which is capable of rehydration and preparation for eating simply by the addition of water, preferably boiling water without any further heating or cooking.

While the process is applicable to various types of grains, it is especially suitable for use with wheat of various types such as red and white high protein wheats, medium and soft wheats, durum wheats as well as other Triticum species, barley, triticale, rye, sorghums and millets, maize oats and the like.

With appropriate variation of the process, an expanded crunchy grain may be produced which finds application as a crunchy ready to eat cereal-type food, in mixtures, bars and the like, in which products the quick-cooking or quick rehydration characteristic is not required in use even though it is an intrinsic characteristic of the food produced by the process.

DETAILED DESCRIPTION OF A PREFERRED EMBODIMENT OF THE INVENTION

An embodiment of the invention will be described in relation to wheat.

Wheat which has been fully cleaned and graded is first hydrated by steeping at an elevated temperature which may be typically at 50° to 65° C. preferably at 60° C. The advantage of so elevating the temperature is that the time required for moisture absorption is usefully shortened, the risk of microbial activity during steeping is essentially eliminated and no starch gelatinisation will occur. Water absorption is continued until the moisture content increases to about 20% to about 45%, preferably 30% to 35%. Depending on the type of finished product required a final moisture content of about 30% or about 35% may be chosen as will be referred to later. The duration of the steeping process is typically 60 to 90 minutes, the exact time being dependent on the type of grain being processed the steep temperature and the final moisture content required.

When the grain has absorbed moisture to the desired moisture content it is dewatered or drained of free surface water. Because there has been no removal of any of the bran at this stage there is an advantage that less of the wheat solids are lost into the steep water. While bran may be removed prior to moisture increase, it is preferred that if any bran is to be removed it should be carried out at a later stage of the process as will be described. However, if the bran is of dark colour or of strong flavour, it may be preferred to remove at least part of the bran prior to steeping.

After dewatering or draining as required the grain may require a tempering period to achieve more uniform moisture distribution throughout the grain for example for about 30 minutes. Thereafter the grain is cooked.

To achieve an ultimately quick-cooking wheat food, it is desired that the cooking process be such that only partial gelatinisation of the starch in the grain should be effected. A preferred method of cooking is to use a continuous steam cooker, operating under pressure in which the grain is kept continually slowly moving. If the temperature in the vessel is 121° C. (equivalent to 15 p.s.i. gauge) a cook time of about 7 minutes to 14 minutes, preferably about 10 minutes, is required.

Other methods of cooking in steam may be employed, for example, use of a batch steam pressure cooker.

At a moisture content of 30% after steeping, 10 minutes of cooking at 121° C. will achieve a suitable degree of partial gelatinisation, whereby the centre of each grain can be seen to be less gelatinised, bordering on ungelatinised. It will be understood to persons skilled in the art that the temperature and duration of the cook can be inversely varied without particularly varying the degree of gelatinisation, It is also possible to carry out the partial gelatinisation process in the steep water by increasing its temperature, However it has been found that better control and continuity is achieved by the procedure described above.

The cooked grains exit from the cooker in an extremely separate condition, that is, there is no tendency for the grains to clump together. This is because the bran layer is intact and little or no free starch is available to effect cohesion.

The cooked grains are then partly dehydrated until the moisture content is reduced to 18–30%, preferably 22–24%. This is best carried out by using through-bed continuous dehydration equipment, fluid bed drying or the like. Air temperature for dehydration should be such that the product temperature does not exceed about 100° C. A product temperature during dehydration of about 75° C. is quite satisfactory. As soon as the target moisture content is reached the grain may be moved to an abrasive bran removal machine (such as the type of machine widely used for polishing rice) and a degree of bran removal may be effected. Removal of bran at this stage is optional and is not required for the performance of the invention. If partial bran removal is carried out the amount of bran removed would normally be no more than about 5% of the weight of the grain. This will depend on the type of grain being processed and the preference of the processor or the ultimate consumers.

After partial dehydration (and partial bran removal, if this is carried out) the grain is tempered without significant moisture loss for about 15 to 30 minutes. This tempering period allows moisture in the centre of the grains to diffuse outwards to equilibrate with the surface of the grains which is drier as a consequence of the partial dehydration. It is necessary to achieve reasonable moisture uniformity in preparation for the next step of the process.

The tempered grains are then compressed for example by passing them between the rolls of a roller mill set such that the gap between the rolls is about 0.15 mm to 0.55 mm.

preferably about 0.4 to 0.45 mm. Compression causes a degree of flattening of the grain, but because the product is somewhat rubbery at this stage the grains bounce back to a thickness which is much greater than the gap through which they pass in the roller mill. The brief tempering period prior to rolling is intended to minimise the tendency of the grains from cracking radially at the periphery. After compression the grains still have the appearance of natural grains, though slightly flattened, the normal shape and the crease being quite identifiable.

After compression the grains are dried in a dehydrating unit in such a way that a degree of expansion occurs. For products which are to be cooked in 5–7 minutes, drying is effected immediately after compression, that is, while the moisture content is at or slightly below that at which compression is carried out. To achieve a desirable result, the grains are exposed to rapidly moving air at about 170° C. to about 230° C., preferable at about 200°–210° C., the grains being actively fluidised in the rapidly moving air. It requires about 30–40 seconds for the grains to be dried to about 12% moisture, though this time will vary somewhat depending on temperature and on the balance of airspeed and feed rate of the grains into the dehydrating unit.

In order to produce a more rapidly cookable grain suitable for instant snack meals the same general procedure is followed, except that the grain is cooked for a longer period, for example 20 to 25 minutes at 121 ° C. and the compression is increased such that the gap between the rolls is about half of that indicated above (namely 0.4–0.45 mm). This product hats a bulk density when dried of about 300 g/liter while the first described product has a bulk density of about 360–400 g/liter. However these bulk density figures will vary depending on the type of grain processed.

Thus by varying the processing parameters as described the ultimate cook time of the grain may be varied from "instant"—requiring about 2 minutes of cooking, to "rapid"—requiring about 5 to 7 minutes of cooking. It will be understood that products can be produced having various different ultimate cooking times by varying certain of the processing parameters as described.

Either of the above products or their variants may be changed from whole-grain form to a reduced size by for example passing the dry whole grain products through crushing equipment to produce a fragmented whole-grain product. The size of the fragments may be varied according to market requirements. Such a fragmented whole grain product can be analogous to a whole-grain cous-cous or pilpil. In the present case, the fragmented whole-grain product may be prepared for eating simply by addition of water, preferably boiling water after which a wait of only 2 to 3 minutes is required to achieve hydration.

To produce an expanded crunchy grain product which does not require cooking the basic process as described above is varied by extending the steep time and hence the moisture content increase to the upper end of the indicated range, for example by steeping for about 90 minutes to achieve a moisture content of about 35%, extending the cook time of the steeped grain to about 35 to 45 minutes at 121° C. (or for a shorter time at a higher temperature), compressing the grain to an extent equal to or greater than that indicated for instant and by drying the compressed grain back to about 12% moisture at a moderate temperature below about 100° C. preferably about 70° C–80° C. followed by toasting of the dried grain in rapidly moving fluidising air at about 190° C. to 230° C. for about 15 to 30 seconds. As a consequence of these process modifications, the toasted grains are more expanded, very crispy and of low bulk density, for example 140 to 200 g/liter.

Optionally, selected enzymes may be used in the process, for example before or after the compression step. Use of enzymes to enhance expansion of rice and waxy grains has been described in Australian Patents 583817 and 610053 but their use on nonwaxy grains such as wheat, barley, rye oats and the like is not disclosed in the prior art.

It will be thus be seen that by varying the heating and temperature ranges depending on the type of product required a whole range of products may be obtained ranging from those requiring extremely short cooking times to those requiring no cooking and in general it has been found that satisfactory products can be produced within these parameters if the heating of the grains is effected at temperatures ranging between 100°– 130° C. for 7–50 minutes.

What is claimed is:

1. A process of preparing an edible food product from wheat or other whole grains comprising the steps of:

increasing the moisture content of the grain to hydrate the grain to a moisture content of about 20–45%;

heating the hydrated grain at temperatures ranging between 100°–130° C. for 7–50 minutes;

dehydrating the grain to a moisture content of about 18–30%;

compressing the grains following a short tempering period; and rapidly drying the grains following compression.

2. A process as claimed in claim 1 wherein the moisture content of the grains is increased by soaking in water.

3. A process as claimed in claim 1 wherein heating of the hydrated grain is effected with live steam.

4. A process as claimed in claim 1 wherein a portion of the outer bran layer of the grains is removed following the dehydration.

5. A process as claimed in claim 1 wherein the grains are subject to compression by passing the grains between the rollers.

6. A process as claimed in claim 1 wherein following compression the grains are dried to a moisture content of about 12% in a rapidly moving air stream at a temperature sufficient to achieve expansion of the grains.

7. A process as claimed in claim 1 wherein the grains following said drying step are sub-divided.

8. A process as claimed in claim 1 wherein said grains are selected from the group consisting of red and white high protein wheats, medium and soft wheats, durum wheats, barley triticale, rye, sorghums, millets, maize and oats.

9. A process as claimed in claim 1 wherein the compressed grain is dried to a moisture content of about 12% at a temperature below about 100° C. and thereafter toasted at about 190° C. to about 230° C. to achieve an expanded crispy texture.

10. An edible food product prepared from wheat or other grains wherein said product has been prepared by increasing the moisture content of the grain to hydrate the grain to a moisture content of about 20–45%;

heating the hydrated grain at temperatures ranging between 100°–130° C. for 7–50 minutes;

dehydrating the grain to a moisture content of about 18–30%;

compressing the grains following a short tempering period; and rapidly drying the grains following compression.

11. An edible food product as claimed in claim 10 wherein the moisture content of the grains is increased by soaking in water.

12. An edible food product as claimed in claim 10 wherein heating of the hydrated grain is effected with live steam.

13. An edible food product as claimed in claim 10 wherein a portion of the outer bran layer is of the grains removed following the dehydration.

14. An edible food product as claimed in claim 10 wherein the grains are subject to compression by passing the grains between the rollers.

15. An edible food product as claimed in claim 10 wherein following compression the grains are dried to a moisture content of about 12% in a rapidly moving air stream at a temperature sufficient to achieve expansion of the grains.

16. An edible food product as claimed in claim 10 wherein the grains following said drying step are sub-divided.

17. An edible food product as claimed in claim 10 wherein said grains are selected from the group consisting of red and white high protein wheats, medium and soft wheats, durum wheats, barley triticale, rye, sorghums, millets, maize and oats.

18. An edible food product as claimed in claim 10 wherein the compressed grain is dried to a moisture content of about 12% at a temperature below about 100° C. and thereafter toasted at about 190° C. to about 230° C. to achieve an expanded crispy texture.

* * * * *